(12) United States Patent
Tristano et al.

(10) Patent No.: US 8,091,689 B2
(45) Date of Patent: Jan. 10, 2012

(54) AUTOMATIC PARKING BRAKE

(75) Inventors: Nicola Tristano, Matera (IT); Monika Schefzik, Steinfeld-Hausen (DE); Francesco Onorato, Matera (IT); Corrado Caruso, Bari (IT); Pietro Patano, Palo Del Colle (IT)

(73) Assignee: Robert Bosch GmbH, Stuttgart (DE)

( * ) Notice: Subject to any disclaimer, the term of this patent is extended or adjusted under 35 U.S.C. 154(b) by 940 days.

(21) Appl. No.: 12/089,235

(22) PCT Filed: Oct. 4, 2006

(86) PCT No.: PCT/EP2006/009608
§ 371 (c)(1),
(2), (4) Date: Apr. 14, 2008

(87) PCT Pub. No.: WO2007/039292
PCT Pub. Date: Apr. 12, 2007

(65) Prior Publication Data
US 2008/0257661 A1    Oct. 23, 2008

(30) Foreign Application Priority Data
Oct. 5, 2005 (FR) .................................... 05 10156

(51) Int. Cl.
*F16D 55/26* (2006.01)
(52) U.S. Cl. ..................................... 188/72.6; 188/72.4
(58) Field of Classification Search ................. 188/72.1, 188/72.4, 72.6, 72.7, 73.1, 72.8
See application file for complete search history.

(56) References Cited

U.S. PATENT DOCUMENTS

| | | | |
|---|---|---|---|
| 3,983,975 A | 10/1976 | Wright | |
| 4,610,331 A * | 9/1986 | Rogier et al. | 188/18 A |
| 6,394,235 B1 | 5/2002 | Poertzgen et al. | |
| 6,948,595 B2 * | 9/2005 | Audren et al. | 188/72.8 |
| 2005/0252736 A1 | 11/2005 | Leiter et al. | |
| 2005/0258682 A1 | 11/2005 | Halasy-Wimmer et al. | |
| 2007/0267255 A1 * | 11/2007 | Inagaki et al. | 188/72.4 |

FOREIGN PATENT DOCUMENTS

DE    19934161 A1    2/2001
EP    0866236 A1    9/1998

OTHER PUBLICATIONS

PCT/EP2006/009608 International Search Report.

* cited by examiner

*Primary Examiner* — Melanie Torres Williams
(74) *Attorney, Agent, or Firm* — Michael Best & Freidrich LLP

(57) ABSTRACT

The invention relates to an automatic parking brake acting on a disk brake and in which the piston of the brake comprises a cavity in which there is a spring (1) allowing pressure to be applied to the end (12) of the piston cavity. A washer (5) is positioned between the inlet (13) of the cavity and the spring (1). A pressing device (4) allows pressure to be applied to the washer (5) so that it preloads the spring (1).

11 Claims, 3 Drawing Sheets

AUTOMATIC PARKING BRAKE

BACKGROUND OF THE INVENTION

The invention relates to an automatic parking brake allowing action on a disk brake and in particular to a spring-loaded device incorporated into the piston that operates the disk brake. This spring-loaded device can be preadjusted to take account of phenomena whereby the brake disk and brake linings become cooled.

The invention therefore also relates to a method of preadjusting such an automatic parking brake.

The use of elastic components interposed in the line along which the braking forces transmitted in an automatic parking brake are transmitted in order to reduce the thermal effect is already known, for example, from documents DE 103 02 357 and EP 0 866 236. However, these systems are not compact enough and are difficult to adapt in order to be able to incorporate them into brake pistons without increasing the size of the pistons.

Furthermore, in the automatic parking brake systems incorporated into the calipers and known in the art (see U.S. Pat. No. 6,394,235 and DE 199 34 161) no braking force measurement is taken except for the measuring of the current powering the electric motor that operates the automatic parking brake actuator.

The force used to immobilize the vehicle is halted when the current powering the motor reaches a set level.

However, various factors such as temperature which may affect the correspondence between the current powering the motor and the braking force needed to immobilize the vehicle are not taken into consideration.

SUMMARY OF THE INVENTION

This invention describes a compact and simple device with elastic behavior and which can be adapted to various sizes of pistons currently in widespread use. With the device according to the invention, there is no need to increase the size of the brakes. Such a brake according to the invention makes it possible to compensate for thermal relaxation due to cooling and allows the force used to immobilize the vehicle to be monitored.

The invention therefore provides a simple and compact device capable of compensating for thermal relaxation and, in addition, of providing precise information as to the effective load to immobilize the vehicle.

The invention therefore relates to an automatic parking brake acting on a disk brake comprising an elastic device situated inside a cavity of a piston of a brake, said device being intended to receive, via the inlet of the cavity, braking forces and to pass them on to the end of the cavity of said piston so that the latter can exert a braking force on brake pads of the disk brake. According to the invention, there are: a spring allowing pressure to be applied to the end of the piston cavity, a first washer positioned between the inlet of the cavity and the spring, a pressing device allowing pressure to be applied to said first washer so that it preloads the spring.

Provision will advantageously be made for the pressing device to comprise a first nut provided with an external screw thread (or ring threaded on its external peripheral surface) and for the interior wall of the inlet of the cavity to comprise an internal screw thread into which said first nut is screwed.

In addition, there will advantageously be: a central core positioned along the axis of the spring and of the washer, and intended to press against the end of the piston cavity via a first extremity, a second extremity of the central core protruding from beyond the first washer towards the inlet of the cavity and comprising a threaded part, a second nut being screwed onto this threaded part and being intended to adjust the position of the central core with respect to the end of the cavity of the piston and to press against the first washer in order to transmit braking forces to the end of the cavity of the piston.

There will also advantageously be a second washer between said spring and the end of the cavity of the piston.

According to a preferred embodiment of the invention, said spring provided in the cavity of the piston comprises a stack of spring disks.

Furthermore, provision will advantageously be made for the spring disks of this stack to have internal and external radial projections which can slide in grooves provided, on the one hand, in the peripheral surface of the central core and, on the other hand, in the interior surface of the cavity of the piston. This will make it possible to prevent the central core from turning relative to the piston.

Provision will also be made for the spring disks to have peripheral notches so as to allow the brake fluid to flow easily inside the cavity of the piston.

For the same reason, as an alternative, provision will be made for the interior surface of the cavity of the piston to have grooves or spacer pieces.

According to an alternative form of embodiment, provision will also be made for the stack of spring disks to be contained in a flexible envelope, as this will make it possible to prevent the brake fluid from entering the stack of spring disks.

The invention also relates to a method of adjusting a parking brake like the one described hereinabove. This method envisages: placing the spring, the washer and the pressing device in the cavity of the piston, then applying a compression force to the spring corresponding to the preload to be applied to the spring, next, the pressing device is adjusted in such a way that it presses against said washer.

If the pressing device is said first nut screwed into the opening of the cavity of the piston, then adjustment of the pressing device envisages tightening this nut until it comes into contact with said washer.

This method also envisages adjusting the position of said second nut with no compression force applied and measuring the distance traveled by the central core as a result of the application of a compression force.

The method of the invention also envisages measuring the compression forces applied and measuring the travel of the central core. The changes in gradient of the characteristic (force/travel) curve are also detected so as to detect the travel that will provide a good adjustment, and the position of said second nut is then adjusted with no force applied.

BRIEF DESCRIPTION OF THE DRAWINGS

The various objects and features of the invention will become more clearly apparent in the description which will follow and in the attached figures which depict.

DETAILED DESCRIPTION

Figure 1:
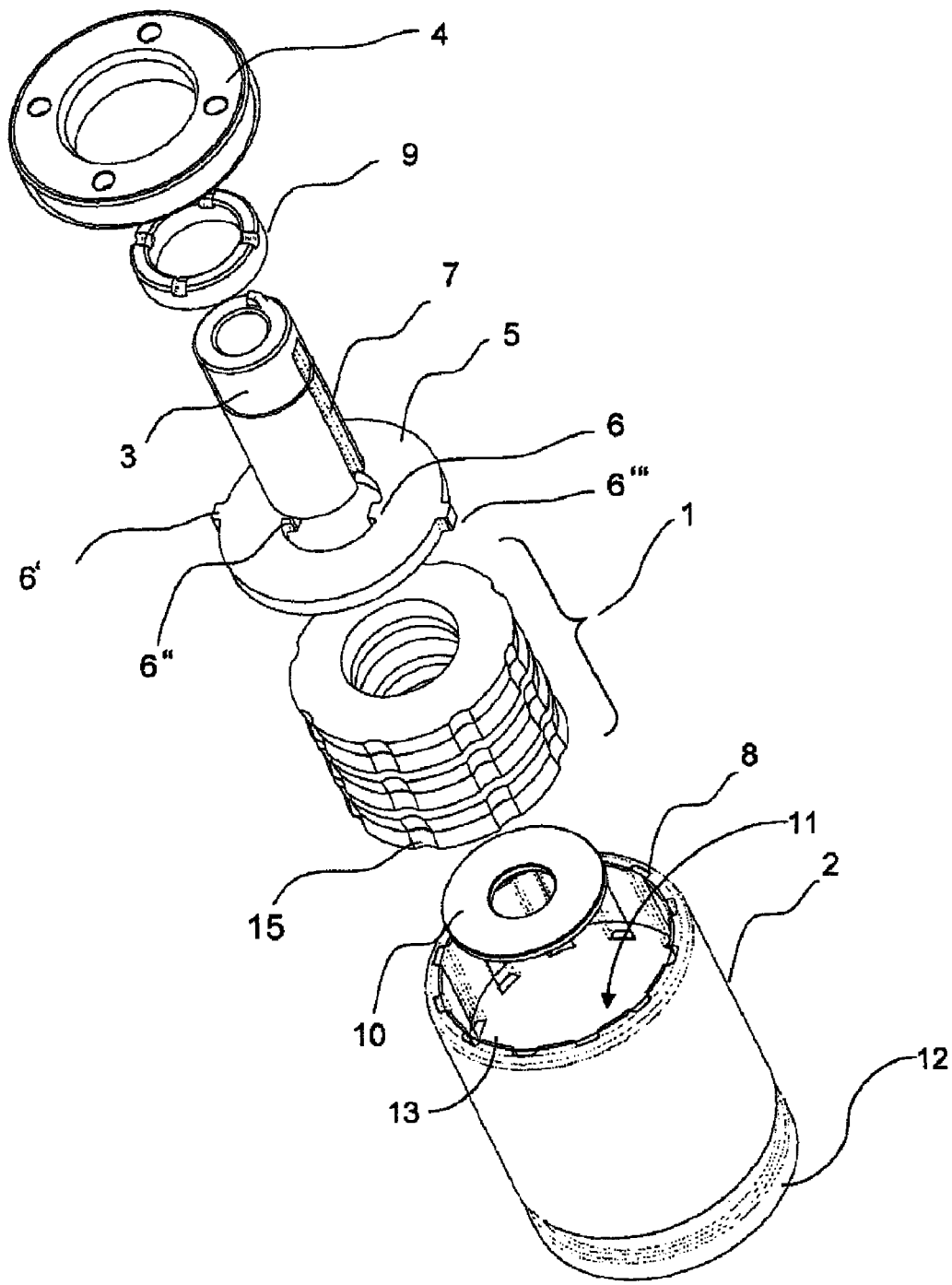
FIG. 1: an exploded view of the device according to the invention.
Figure 2:
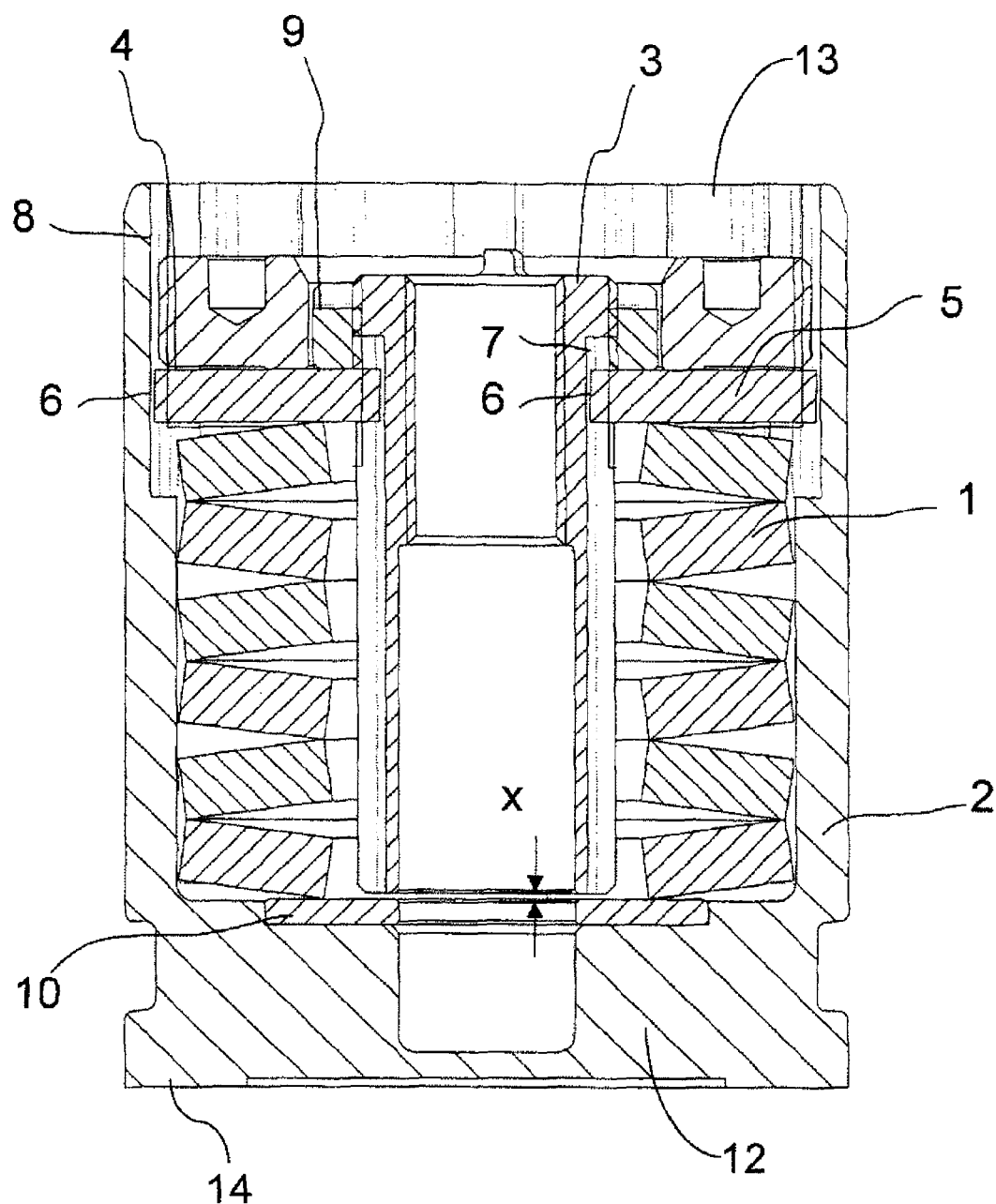
FIG. 2: a view in axial section of the device according to the invention.

As illustrated by FIGS. 1 and 2, the device of the invention is made up of a stack of spring disks 1 which is placed in the cavity 11 of the brake piston 2. The stack of spring disks is intended to press against the end 12 of the cavity of the piston, which end is on the same side as the face of the piston that acts as a pressure face 14 transmitting pressure to a brake pad.

A central core 3 is positioned along the axis of the stack of spring disks.

A washer 5 is threaded onto the core 3 and allows pressure to be applied to the stack of spring disks.

The inlet 13 of the cavity 11 of the piston is equipped with an internal screw thread. A first nut 4, which is equipped with an external screw thread, is screwed into the internal screw thread of the inlet 13 of the cavity 11 of the brake piston and allows pressure to be exerted on the washer 5 in order to compress the stack of spring disks against the end 12 of the cavity. This arrangement makes it possible, as will be seen later on, to determine an initial load or preload on the stack of spring disks.

Furthermore, a second nut 9 is screwed onto the extremity of the central core 3 which emerges from the washer 5 and allows the length of the core that can be contained inside the stack of spring disks to be adjusted. As will be seen, this arrangement makes it possible to determine the maximum compression of the stack of spring disks.

For completeness, and for reasons of preciseness of the adjustment of the device, a thrust washer 10 is provided in the end of the cavity of the piston. The stack 1 of spring disks presses against the end of the cavity of the piston via this thrust washer 10.

In the device thus described, a braking force supplied by the automatic parking brake system is passed on, via the central core 3, to the brake piston 2 through the stack of spring disks 1 and the thrust washer 10.

It can therefore be seen from FIG. 2 that, by screwing the nut 4 into the cavity of the piston, the washer 5 is forced to move downward (in FIG. 2). This washer then presses against the stack of spring disks 1 which is thus compressed between the washer 10 and the end of the piston. The stack of spring disks is thus preloaded.

Furthermore, the central core slides freely in an axial direction through the washer 5. The same is true of the sliding of the nut 9 in the nut 4.

The nut 9 which is screwed into the central core 3 allows the position of the central core to be adjusted with respect to the washer 5 and, ultimately, allows the position of the extremity of the central core to be adjusted relative to the washer 10. That then means that the space X between the extremity of the core 3 and the washer 10 can be adjusted, thus defining the travel of the spring.

The stack of spring disks will make no elastic contribution until the preload of the stack of spring disks has been overcome.

Figure 3A:
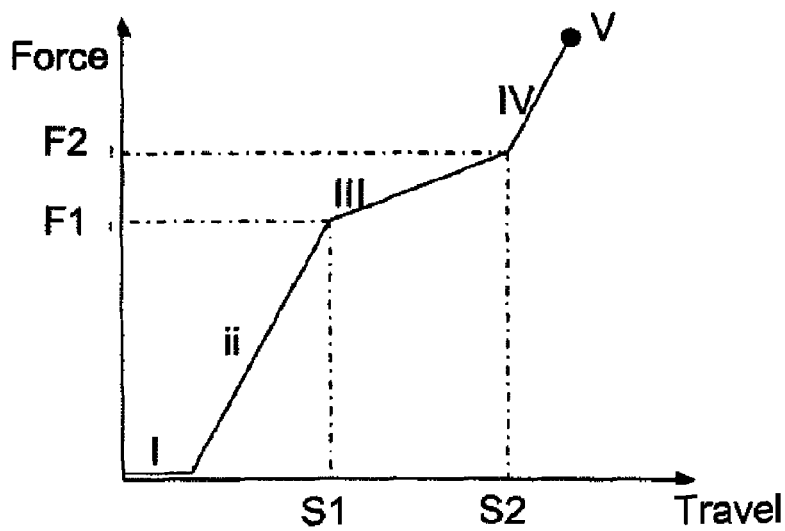
FIGS. 3a to 3c: operating curves of the automatic parking brake according to the invention.

FIG. 3a depicts an operating curve for the braking system according to the invention.

FIG. 3a depicts the overall operating characteristic of such a device during operation of the automatic parking brake.

The curve of FIG. 3a therefore represents the overall characteristic of a system applied to a brake disk in which the travel of the stack of spring disks is limited by the two nuts 4 and 9. This curve can be split into five different regions referenced I to V.

These regions are obtained by indirect measurement of the force applied to the braking devices, for example through the current powering the electric operating motor.

F1 corresponds to the preload on the stack of spring disks as defined by tightening the nut 4. This preload can be defined as being equal to the minimum braking force required to immobilize the vehicle.

F2 is the level of force at maximum compression of the stack of spring disks and which is defined by the screwing of the nut 9 onto the central core 3.

The travel S1-S2 represents the maximum compression of the stack of spring disks. This travel corresponds to the distance X indicated in FIG. 2 and is determined for each application so that the compression (travel) of the stack of spring disks is enough to compensate for the travel due to thermal relaxation of the system. The force of the nut 4 on the stack of spring disks is therefore set with the necessary preciseness.

By way of example, the travel S1–S2=X may have a value of 0.3 mm.

In region I the force is very low because it corresponds to the dead travel of the braking system that has to be overcome.

In region II, the force generated by the parking brake is lower than the magnitude of the preload on the stack of spring disks. The behavior of the parking braking system is determined by the elasticity of the brake calipers, and the spring-loaded device has no influence.

When the force applied reaches the magnitude of the preload F1 on the stack of spring disks, this stack begins to be compressed until region III is reached.

In region III there is an apparent change in the elasticity of the braking system and as a result of this, a significant change in the gradient of the curve by comparison with the gradient of region II can be seen.

When the applied force reaches the level that corresponds to maximum compression of the stack of spring disks (no further compression of the spring is now possible), the system reaches region IV.

In region IV, the spring-loaded device no longer acts and the behavior of the system is determined by the disk brake device alone, and in particular by the calipers of the disk brake.

If the force produced by the element that operates the parking brake (an electric motor for example) increases until its maximum value is reached (for example until the motor jams) then point V is reached at which no further increase in force or in travel can be achieved.

Figure 3B:
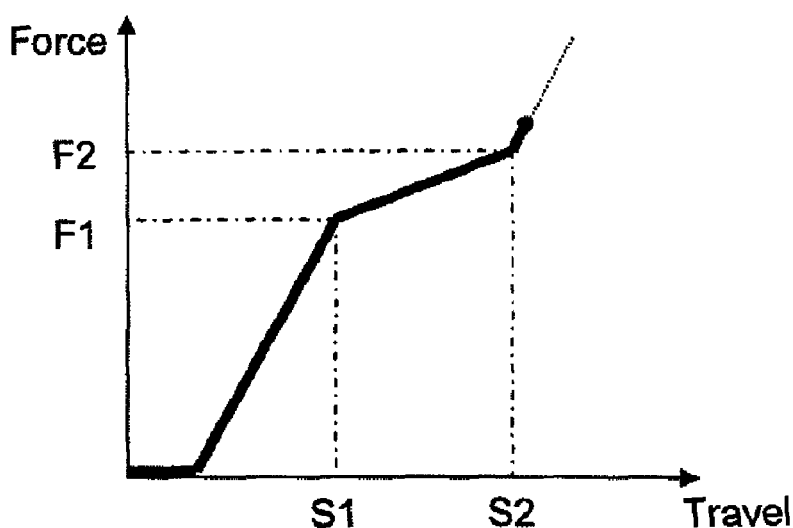

This is why it may be preferable to operate according to the characteristic of FIG. 3b.

FIG. 3b shows a preferred operation of the system according to the invention using the curve of force as a function of travel during a parking brake application cycle. This curve is similar to that of FIG. 3a.

The force is increased until the second change-of-gradient point, after region III, is identified during indirect measurement of the force. As soon as this second change-of-gradient point is reached, the increase in force is halted. Proceeding in this way guarantees that the braking force will remain above the required braking force and that the strength of the force will be maintained even after thermal relaxation.

The position of the nut 9 of the spring-loaded device is determined in such a way that the corresponding compression of the spring-loaded device is enough to compensate for the travel due to thermal relaxation.

Figure 3C:
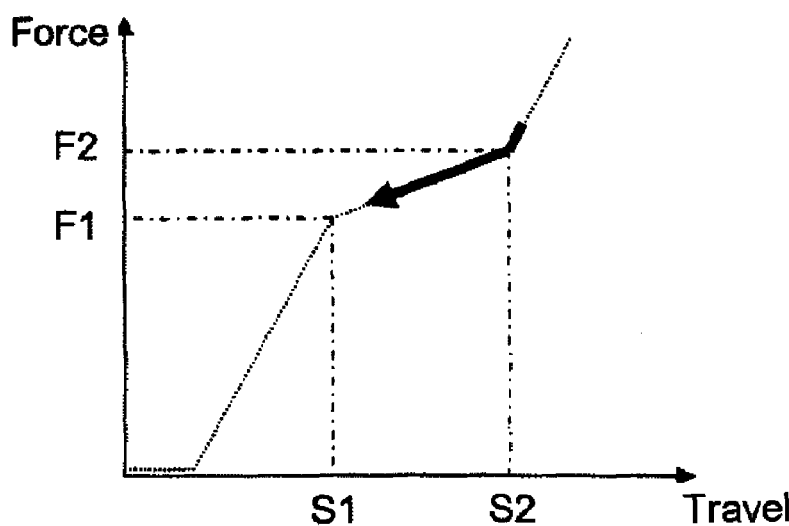

FIG. 3c depicts the behavior of the system and particularly the travel of the braking device upon cooling. Because of the contraction of the linings and of the disk as a result of this cooling, the travel and the braking force decrease but are limited by the expanding of the spring-loaded device so that the braking force always remains above the required braking force magnitude F1.

The values of the forces corresponding to the positions of the two nuts 4 and 9 of the spring-loaded device are known very precisely (for example during preadjustment). They can be used to calibrate the indirect function used to measure force during each specific application.

The operating curve thus described also allows monitoring of the components of the parking brake system. The ratio between the magnitudes of the forces at the two change-of-gradient points during indirect measurement of the force corresponds to the ratio of the preload to the final load of the spring-loaded device. The measured values and the ratios thereof can be stored in a memory and compared against planned ratios. Thus, the possible changes in the spring-loaded device can be monitored.

The preciseness of the abovementioned method is dependent on the preciseness with which the positions of the nuts 4 and 9 are preadjusted.

In order to obtain an adjustment that is as precise as possible of the preload force and of the travel of the stack of spring disks, while at the same time taking account of the elasticity tolerances on all the components, the preadjustment method envisages adjusting the positions of the two nuts 4 and 9 independently.

The assembled piston is placed in a device capable of applying axial compression forces between the central core 3 and the piston 2. This force needs to be able to be varied between 0 and a maximum value of the order of 20 kN. This force is applied while at the same time measuring the force and the travel.

The positions of the nuts will be adjusted using special tools for turning the nuts.

A force corresponding to the preload that is to be applied to the stack of spring disks is applied to the washer 5. The nut 4 can thus be screwed easily into the cavity 11 of the piston until it comes into contact with the washer 5 thus making it possible to set the preload on the stack of spring disks 1.

Next, during release of the force, it is possible to measure the return travel of the central core. As the force is no longer applied to the device, the position of the nut 9 can be altered and the travel measured once again by applying a force and then removing it. The detection of changes of gradient as seen in the curves 3a to 3b can be used to detect the values of the forces F1 and F2 at the change-of-gradient points, thus making it possible to adjust the axial distance X traveled by the central core 3.

When preadjustment has been performed, the positions of the nuts 4 and 9 can be fixed by any means, for example by damaging the screw threads into which the nuts are screwed, by applying a spot of welding to the screw threads or by any other means.

Furthermore, the washer 5 has radial projections such as 6 and 6' which slide in grooves 7 and 8 of the core and of the piston respectively. For example, the projection 6 projects towards the inside of the washer 5 and slides in the groove 7 of the central core 3. The projection 6' projects towards the outside of the washer 5 and slides in the groove 8 of the cavity 11 of the piston.

These elements prevent the central core 3 from rotating. The grooves 7 in the core are long enough to perform this function even when the core is pulled away from the washer 10 in order, for example, to replace the linings.

To allow the brake piston to operate correctly, the invention additionally envisages for the spring disks to have a special peripheral shape in order to allow a brake fluid to pass between the disks.

For example, provision is made for the disks to have notches 15 on their periphery as can be seen in FIG. 1. As an alternative, it is possible to provide grooves and/or spacer pieces on the interior wall of the piston so as to create paths along which the brake fluid can pass.

It may also be possible to envisage coating the stack of spring disks with a rubber membrane.

In the foregoing, a stack of spring disks has been provided but this spring-loaded device could be designed differently and adopt any other form.

The device according to the invention therefore comprises a piston the cavity of which is large enough in size that it can contain a stack of spring disks and that a screw/nut device can be positioned along the axis of the piston to adjust the application of automatic parking brake braking forces. An arrangement such as this makes it possible to avoid additional increases in the size of the piston and therefore of the brake.

The stack of spring disks does not affect the operation of the service brake. It increases the elasticity of the brake over a limited range of forces just needed for actuating the parking brake.

As in current automatic parking brake systems, the force needed to immobilize the vehicle is produced by an electric motor acting on a screw-nut transmission device via a speed reduction box. In the device according to the invention, the brake operating force is transferred from the motor to the brake piston via the stack of springs.

The stack of spring disks is preloaded by the nut 4 and the washer 5 so that the spring makes no elastic contribution until the preload force has been reached.

The magnitude of the preload force is chosen according to the specific application so that it equals the minimum force needed to immobilize the vehicle that the parking brake has to guarantee even after any thermal relaxation of the braking device. By way of example, the value may approximately lie in the range 13-15 kN.

According to one embodiment of the invention, the rigidity of the stack of spring disks is chosen to be more or less equivalent to that of the braking device (caliper brake) in its entirety so that when the force needed to immobilize the vehicle reaches the magnitude of the preload, the elasticity produced by the motor is approximately doubled.

By detecting the level of increase in current powering the motor, the change in gradient of the operating characteristic can easily be identified in the way that will be described later on, and this change will be easily identifiable.

The unit for controlling the parking brake thus obtains the information that the vehicle immobilizing force produced has reached the minimum acceptable value.

If, according to the parking brake operating mode, no compensation for thermal relaxation is needed, then the application cycle can be stopped.

If compensation for thermal relaxation needs to be envisaged, the application cycle continues.

According to the characteristics of the components of the disk brake, a maximum thermal relaxation effect can be estimated for each specific application. This effect will correspond to a reduction in thickness of the linings by about 0.2 mm overall. To overcome this disadvantage, it is necessary to make sure that the stack of spring disks is compressed at least by the same amount even after the braking device has cooled.

Furthermore, a braking force greater than that needed in order to immobilize the vehicle may be detrimental to the braking devices. This is why the device according to the invention makes it possible to adjust the braking forces applied by the automatic parking brake system.

The invention claimed is:

1. Automatic parking brake acting on a disk brake comprising an elastic device situated inside a cavity (11) of a piston (2) of a brake, said device being intended to receive, via the inlet (13) of the cavity, braking forces and to pass them on to the end (12) of the cavity (11) of said piston so that the latter can exert a braking force on brake pads of the disk brake, a spring (1) allowing pressure to be applied to the end (12) of the piston cavity, a first washer (5) positioned between the inlet (13) of the cavity and the spring (1), a pressing device allowing pressure to be applied to the washer (5) so that it preloads the spring (1), characterized in that a first nut (4) provided with an external screw thread or ring threaded on its external peripheral surface and in that the interior wall of the inlet (13) of the cavity (11) comprises an internal screw thread into which said first nut (4) is screwed, a central core (3) positioned along the axis of the spring (1) and of the washer (5), and intended to press against the end (12) of the piston cavity via a first extremity, a second extremity of the central core protruding from beyond the first washer towards the inlet (13) of the cavity and comprising a threaded part, a second nut (9) being screwed onto this threaded part and being intended to adjust the position of the central core with respect to the end (12) of the cavity (11) of the piston and to press against the first washer in order to transmit braking forces to the end of the cavity of the piston.

2. Automatic parking brake according to claim 1, characterized in that it comprises a second washer (10) between said spring (1) and the end (13) of the cavity of the piston.

3. Automatic parking brake according to claim 1, characterized in that said spring (1) comprises a stack of spring disks.

4. Automatic parking brake according to claim 3, characterized in that the spring disks have internal and external radial projections (6, 6') which can slide in grooves (7, 8) provided, on the one hand, in the peripheral surface of the central core and, on the other hand, in the interior surface of the cavity (11) of the piston.

5. Automatic parking brake according to claim 3, characterized in that the spring disks have peripheral notches (15).

6. Automatic parking brake according to claim 3, characterized in that the interior surface of the cavity (11) of the piston has grooves or spacer pieces.

7. Automatic parking brake according to claim 3, characterized in that the stack of spring disks is contained in a flexible envelope.

8. Method of adjusting a parking brake according to claim 1, comprising placing the spring (1), the washer (5) and the pressing device in the cavity (11) of the piston (2), applying a compression force to the spring (1) then adjusting the pressing device in such a way that it presses against the washer (5).

9. Method according to claim 8, characterized in that the pressing device comprises said first nut (4) screwed into the opening (13) of the cavity (11) of the piston and in that adjusting the pressing device envisages tightening said first nut until it comes into contact with said washer (5).

10. Method according to claim 9, characterized by adjusting the position of said second nut (9) with no compression force applied and measuring the distance traveled by the central core as a result of the application of a compression force.

11. Method according to claim 9, characterized in that it envisages measuring the compression forces applied, measuring the travel of the central core (3) and detecting the changes in gradient of the characteristic (force applied/travel) curve so as to detect the travel that will provide for good adjustment, the position of said second nut being adjusted with no force applied.

* * * * *